US008902788B2

United States Patent
Nandagopal

(10) Patent No.: US 8,902,788 B2
(45) Date of Patent: Dec. 2, 2014

(54) METHOD AND SYSTEM FOR ENERGY EFFICIENT ROUTING OF IP PACKETS OVER OPTICAL BACKBONE NETWORKS

(75) Inventor: Thyaga Nandagopal, Edison, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 214 days.

(21) Appl. No.: 13/347,817

(22) Filed: Jan. 11, 2012

(65) Prior Publication Data

US 2013/0177312 A1 Jul. 11, 2013

(51) Int. Cl.
*H04W 4/00* (2009.01)

(52) U.S. Cl.
USPC .......................................................... 370/254

(58) Field of Classification Search
None
See application file for complete search history.

(56) References Cited

U.S. PATENT DOCUMENTS

| | | | |
|---|---|---|---|
| 2003/0229807 A1* | 12/2003 | Qiao et al. | 713/200 |
| 2007/0299950 A1* | 12/2007 | Kulkarni | 709/223 |
| 2009/0274464 A1* | 11/2009 | Zi et al. | 398/79 |
| 2010/0284062 A1* | 11/2010 | Itoh et al. | 359/337.1 |
| 2010/0332638 A1* | 12/2010 | Lewis | 709/223 |
| 2011/0310788 A1* | 12/2011 | Lin et al. | 370/315 |
| 2012/0188949 A1* | 7/2012 | Salkintzis et al. | 370/329 |
| 2013/0259472 A1* | 10/2013 | Gebhard | 398/45 |

* cited by examiner

*Primary Examiner* — John Blanton
(74) *Attorney, Agent, or Firm* — Wall & Tong, LLP

(57) ABSTRACT

A method and system for energy-efficient routing of IP packets in which ingress traffic is forward from ingress nodes directly to source dominator nodes without address destination processing such that related address processing elements may be avoided in the ingress nodes. The source dominator nodes perform address destination processing and forward the packets to destination dominator nodes proximate the destination node.

20 Claims, 7 Drawing Sheets

METHOD AND SYSTEM FOR ENERGY EFFICIENT ROUTING OF IP PACKETS OVER OPTICAL BACKBONE NETWORKS

FIELD OF THE INVENTION

The invention relates generally to the field of communication network and, more specifically, to energy-efficient routing of Internet Protocol (IP) packets over a core optical transport network (OTN).

BACKGROUND

Current IP networks consume significant amounts of energy in routing packets, largely due to high power consumption of various IP layer router components such as control cards, line cards, memory and the like.

SUMMARY

Various deficiencies of the prior art are addressed by a method and apparatus for energy-efficient routing of Internet Protocol (IP) packets over a core optical transport network (OTN). One embodiment comprises a method of configuring a core network, the method comprising configuring a plurality of core network nodes as dominator nodes, each dominator node being adapted to route traffic toward at least one other dominator node via a respective wavelength, each dominator node being adapted to determine a respective destination node for each traffic flow received from a non-dominator node and to route each traffic flow toward a dominator node associated with the respective destination node; and configuring a plurality of core network nodes as non-dominator nodes, each non-dominator node being adapted to route respective ingress traffic flows toward a neighboring dominator node without determining corresponding destination nodes associated with the respective ingress traffic flows.

BRIEF DESCRIPTION OF THE DRAWINGS

The teachings of the present invention may be readily understood by considering the following detailed description in conjunction with the accompanying drawings, in which.

To facilitate understanding, identical reference numerals have been used, where possible, to designate identical elements that are common to the Figures.

DETAILED DESCRIPTION

The invention will be primarily described within the context of particular embodiments; however, those skilled in the art and informed by the teachings herein will realize that the invention is also applicable to other technical areas and/or embodiments.

Generally speaking, the various embodiments enable, support and/or provide a network and/or network component configuration mechanism enabling energy-efficient routing of IP packets belonging to any traffic flow. In various embodiments, a network routing topology is configured such that packet inspection, destination address lookup functions and the like are avoided at network ingress nodes, thereby avoiding the need and energy expense of components supporting these functions.

In particular, wavelength circuits are established between selected core router node pairs (denoted as dominator node pairs or router pairs), which are used to send packets to each other entirely in the optical domain. Packets received by a non-dominator node (e.g., an ingress node) are routed to an associated dominator node associated where such destination address processing is performed. The traffic flow is then directed toward a destination dominator node via a predefined optical wavelength for subsequent routing to the destination node.

In one embodiment, one IP lookup is performed at the core router where the packet enters the network for the first time. This entry core router performs a destination lookup and maps the packet to a wavelength circuit corresponding to the exit core-router that will route packets to the destination.

Figure 1:
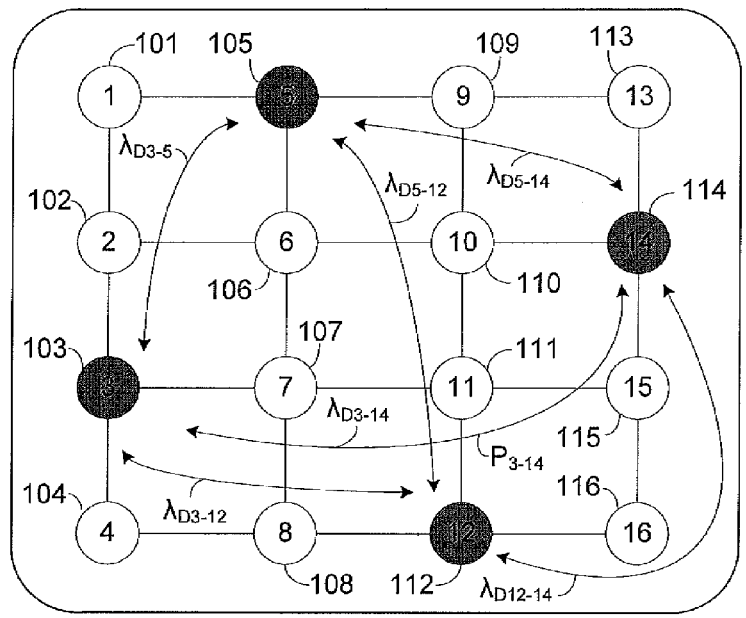
FIG. 1 depicts an exemplary network according to an embodiment.

FIG. 1 depicts an exemplary network according to an embodiment. Specifically, FIG. 1 depicts an exemplary Optical Backbone network system 100 that includes a plurality of core routers 101-116 connected as, illustratively, a 4×4 grid of nodes.

Optical Backbone network system 100 is an exemplary system only; other types of systems may be used within the context of the various embodiments. The basic configuration and operation of the Optical Backbone network system will be understood by one skilled in the art as described herein.

The Optical Backbone network system 100 is configured such that there are two types of nodes: (1) dominator core-router nodes; and (2) non-dominator core-router nodes. The determination of each type is further described below, such as with respect to FIG. 3. Within the context of the network 100 of FIG. 1, core-router nodes 103, 105, 112 and 114 are designated as dominator nodes, while core-router nodes 101-102, 104, 106-111, 113 and 115-116 are designated as non-dominator core-router nodes. In various embodiments, any node may be an entry or exit core router node. These components as well as various components which have been omitted for purposes of clarity, cooperate to provide the functions of an Optical Transport Network (OTN).

For each pair of dominator nodes (e.g., 103=106, 106=114, 114=112, 103=112, 103=114), a unique wavelength is assigned. This implies that nodes in the path between the two nodes would have to use this wavelength for routing traffic between the pair of nodes. Nodes not on a path between these two nodes may use the same wavelength for routing between two other nodes as long as that path does not overlap with any other path using the same wavelength.

As depicted in FIG. 1, there are 4 dominator nodes; each pair of dominator nodes uses a unique path for which a single wavelength is set up (assuming unit demand between the two nodes). Wavelengths may be re-used as long as they do not overlap with each other along the path. Thus, for the 4 unique pairs of dominator nodes, only 2 unique wavelengths are needed in this specific topology. Namely, $\lambda_{D3-5}$, $\lambda_{D3-12}$, $\lambda_{D5-12}$, $\lambda_{D5-14}$, $\lambda_{D12-14}$ are the same wavelength because there is no overlapping involved and $\lambda_{D3-14}$ is the other wavelength for a total of 2 unique wavelengths using the least hop paths between any two dominator nodes.

In this embodiment, a maximum of 16 ($4^2$) unique wavelengths would be required (i.e., $n^2$ unique wavelengths are required to provision for a unit of traffic for a network with 'n' core routers in order to handle the worst-case traffic-flows). Wavelength assignment is further discussed below with respect to FIG. 4.

Figure 2:
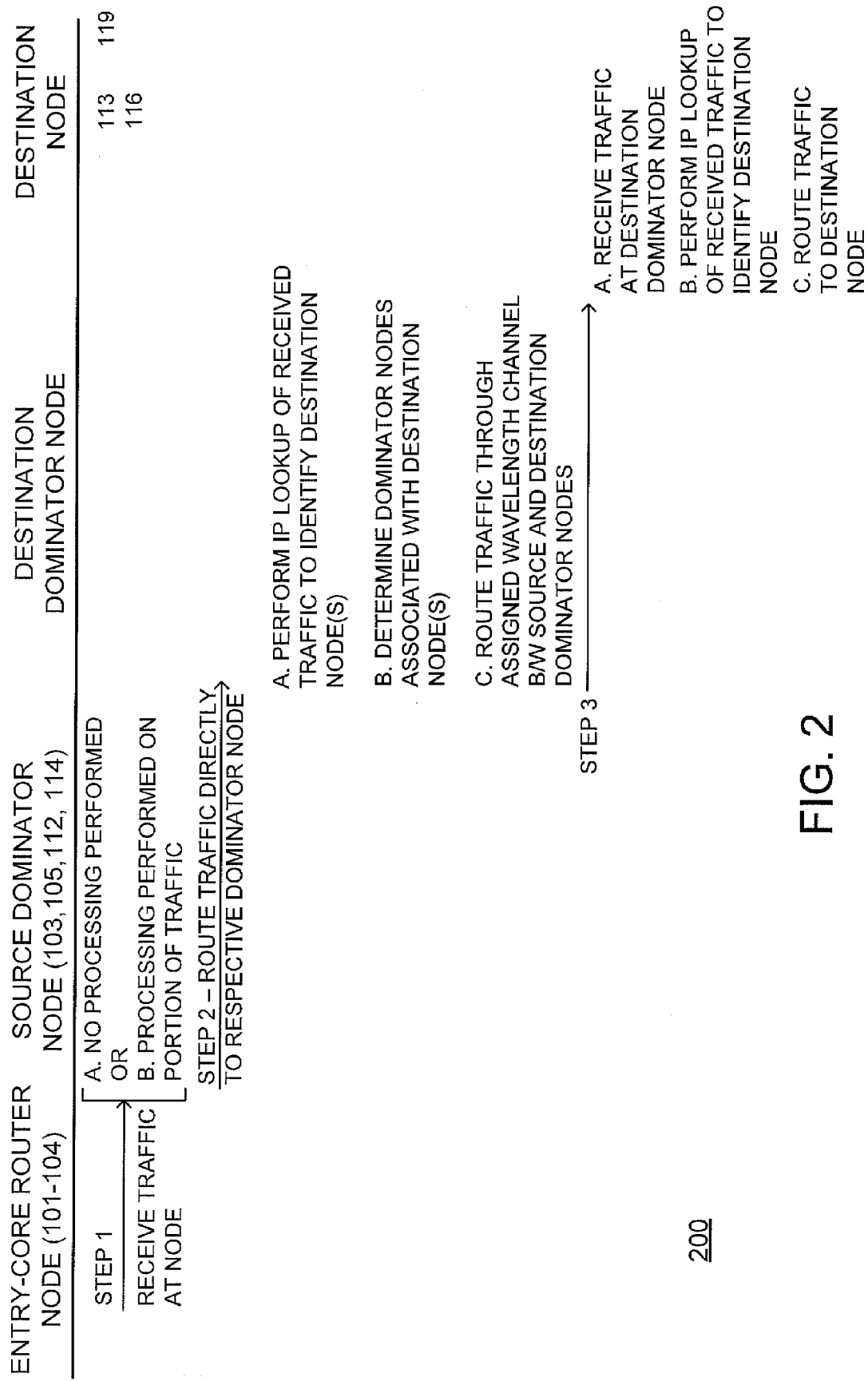
FIG. 2 depicts a flow diagram of a method according to an embodiment.

FIG. 2 depicts a flow diagram of a method according to an embodiment. Specifically, FIG. 2 graphically depicts steps performed by various entities within the context of a method according to one embodiment.

At step 1, traffic is received at any of entry core-router nodes 101-104. In one embodiment, traffic is received at non-dominator core-router nodes 101-102 and 104, which perform no address processing and immediately route the received traffic to dominator core-router node 103.

In one embodiment, the traffic is received from a trusted source. In another embodiment, traffic is received from unknown source. In another embodiment, non-dominator core-router nodes 101-102 and 104 receive the traffic and perform some processing prior to routing the received traffic to dominator core-router node 103. In this embodiment, the processing performed by non-dominator core-router nodes 101-102 and 104 may include policing functions based on the service level agreement (SLA) of the user associated with the received traffic.

Although primarily described with respect to policing functions, an artisan of ordinary skill in the art will recognize that any function associated with received traffic may be performed by non-dominator core-router nodes 101-102 and 104. In another embodiment, non-dominator core-router nodes 101-102 and 104 receive the traffic and process a portion of the received traffic prior to routing the received traffic to dominator core-router node 103. In this embodiment, the processing functions may be specifically tailored to a certain portion of the received traffic. Although depicted and described with respect to an embodiment in which each of the non-dominator core-router nodes 101-102 and 104 performs entry core-router functions, it will be appreciated by those skilled in the art that any of core-routers 101-116 may be an entry core-router and therefore, performs the functions associated with an entry core-router as herein described.

In another embodiment, traffic is received at dominator core-router node 103. In this embodiment, the received traffic need not be routed to the proximate dominator core-router node because the dominator core-router node is also the entry core-router node. The next step in the process is executed.

At step 2, source dominator core-router node 103 performs a destination IP lookup on the packet header and identifies the exit-core router in the network via which the packet exits the core network. For example, dominator core-router node 103 then sends the packet to the dominator core-router node 114 of the exit-core router. The communication between dominator core-router node 103 and dominator core-router node 114 is entirely in the optical domain, with no IP routing lookups involved.

At dominator core-router node 114, another IP routing lookup is performed on the packet, and the packet is sent to, for example, destination exit-core router 115, where the packet departs the network. As depicted, there are exactly two IP lookups in this entire path inside the core network. In other embodiments, the number of IP lookups may be relative to the topology of the network. The objective of the claimed embodiments is to enable any IP packet to be routed with nominally 2 IP layer lookups while ensuring that the packets stay in the optical plane as much as possible, thereby drastically reducing energy per bit transferred.

In terms of energy consumption, the claimed embodiments consume very little energy; electronic conversion is minimized and even nonexistent. This method requires one-time wavelength path setup, and the capacity may be dynamically adjusted to reflect the amount of traffic carried. Minimizing the number of wavelengths used results in a tradeoff with the optimality of the path length between the dominator nodes, because longer paths may be used in order to avoid using new wavelengths. In embodiments where deterministic traffic flows along a shortest path between pairs of dominator nodes in the graph are obtained, then the path length is guaranteed not to exceed the optimal path length by more than 2 hops.

Illustratively, if Pr is the power needed by a router, Pwdm is the energy needed to transport traffic across an optical link, Proadm is the energy needed for optical switching and Poxc is the power needed to perform grooming and OE+EO conversion, then the energy consumed by a single packet in the proposed scheme, of size B bits, with a K-node shortest path (including source and destination) in the core network can be calculated as follows. Assuming that the packet will traverse the longest path encompassing 2 more hops than the shortest path, the energy consumed is then computed as:

$$Enew = B/2(Pr + Poxc) + K\,\mathrm{Proadm} + (K+1)Pwdm\text{]} \qquad \text{Equation 1}$$

Comparing Equation 1 against the optimal scheme where the packet traverses a dedicated wavelength across the core, yields:

$$Eoptimal = B[K \cdot \mathrm{Proadm} + (K-1)Pwdm] \qquad \text{Equation 2}$$

The energy ratio Enew/Eoptimal is therefore given by Equation 3:

$$\frac{E_{new}}{E_{optimal}} = 1 + \frac{2}{K} \frac{P_r + P_{oxc} + P_{wdm}}{P_{roadm} + (1 - 1/k)P_{wdm}} < 1 + \frac{2}{K}\left(1 + \frac{P_r + P_{oxc} + P_{wdm}}{P_{roadm}}\right),$$

since K>1 in the core network.

Although depicted and described with respect to an embodiment in which dominator core-router node 103 performs the functions outlined above, it will be appreciated by those skilled in the art that any one of dominator core-routers 105, 112 and 114 may operate as a dominator core-router node and therefore performs the functions associated with a dominator core-router node as herein described.

At step 3, destination dominator core-router node 114 receives the forwarded traffic. Dominator core-router node 114 performs an IP routing lookup on the packet, and forwards the packets to destination exit-core router 115, where the packet departs the network. In another embodiment, non-dominator core-router 113 or 116 may be the destination exit-core router node.

Although depicted and described with respect to an embodiment in which dominator core-router node 114 is the destination dominator core-router node, it will be appreciated by those skilled in the art that core-routers 103, 105 and 112 may be a destination dominator core-router node and therefore, perform the functions associated with a destination dominator core-router node as herein described.

Figure 3:
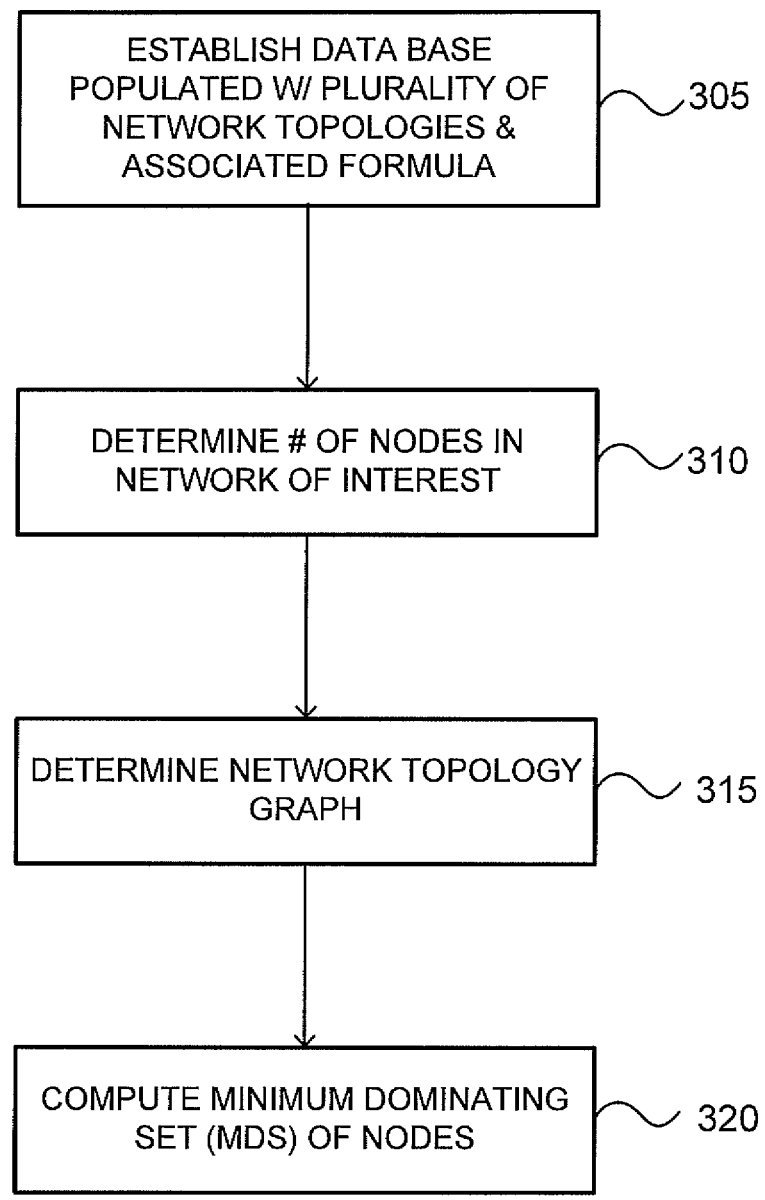
FIG. 3 depicts a flow diagram of a method for determining dominant and non-dominant nodes in a network.

FIG. 3 depicts a flow diagram of a method for determining dominant and non-dominant nodes in a network, such as described above with respect to FIGS. 1-2. The method 300 of FIG. 3 may be performed by a network management system (NMS), element management system (EMS) or other management entity.

At step 305, a database is populated with a plurality of network topologies and associated formula. These embodiments are expressed in the following manner. Let X(V) be the Minimal Dominating Set (MiDS) of the graph G. A MiDS may be different from a Minimum Dominating Set (MDS). Importantly, each MDS is also a MiDS.

The nodes in X are designated as the dominators and Y(V)=V\X is denoted as the set of nodes not in the MiDS. For each node v in the set Y, let N(v) be the set of all neighboring nodes in the graph G and let L(v) be the neighbors of X which also happen to be dominators. In other words, L(v)=N(v)∩X(V), for all v∈Y(V). Note that L(v) may contain more than one node, but it always contains at least one node. A node u is said to be a dominator of node v, i.e., dom (v)=u, if v∈Y(V), u∈X(V)∩N(v). A node in the dominating set dominates itself, i.e., dom(u)=u, if u∈X(V). In conclusion, X(V) need only be a Dominating Set (DS), which is a superset of MiDS.

In a uniform graph embodiment, the number of nodes in the MiDS is approximately $V^{1/2}$. In a ring topology graph embodiment, the number of nodes in the MiDS is V/2, while for a star topology embodiment, the MiDS size is 1. As is evident, the number of nodes in the MiDS of a graph may vary widely, but it definitely is less than V, the number of nodes in the graph.

At step 310, the number of nodes in the network of interest is determined. In step 315, the network topology graph is determined. Given a network topology of core-routers denoted as G=(V,E), where V is the set of core-routers (nodes) and E is the set of links (edges) between them. In one embodiment, each link is one fiber (for simplicity) with M wavelengths, each of capacity C bits per second. In another embodiment, the links are composed of multiple fibers.

At step 320, the Minimal Dominating Set (MiDS) of nodes is computed. In one embodiment, a Minimal Dominating Set (MiDS) of a graph G is a set of nodes such that each node in G is either in the MiDS or is a neighbor of a node in the MiDS. FIG. 1 illustrates the MiDS for a graph. In one embodiment, a dominator node dominates neighboring non-dominator nodes. In another embodiment, a dominator node dominates itself, if the node happens to be the sole node in the core network. In one embodiment, the core network contains a plurality of core-routers. In another embodiment, the core network contains a sole core-router.

In one embodiment, with reference to FIG. 1, core-routers 103, 105, 112 and 114 are dominator nodes. In another embodiment, core-routers 101-102, 104, 106-111, 112-113 and 115-116 are non-dominator nodes. Traffic may be received at any of core routers 101-116. It will be appreciated by those skilled in the art that any node may be dominator or non-dominator based on the specific topology involved.

Figure 4:
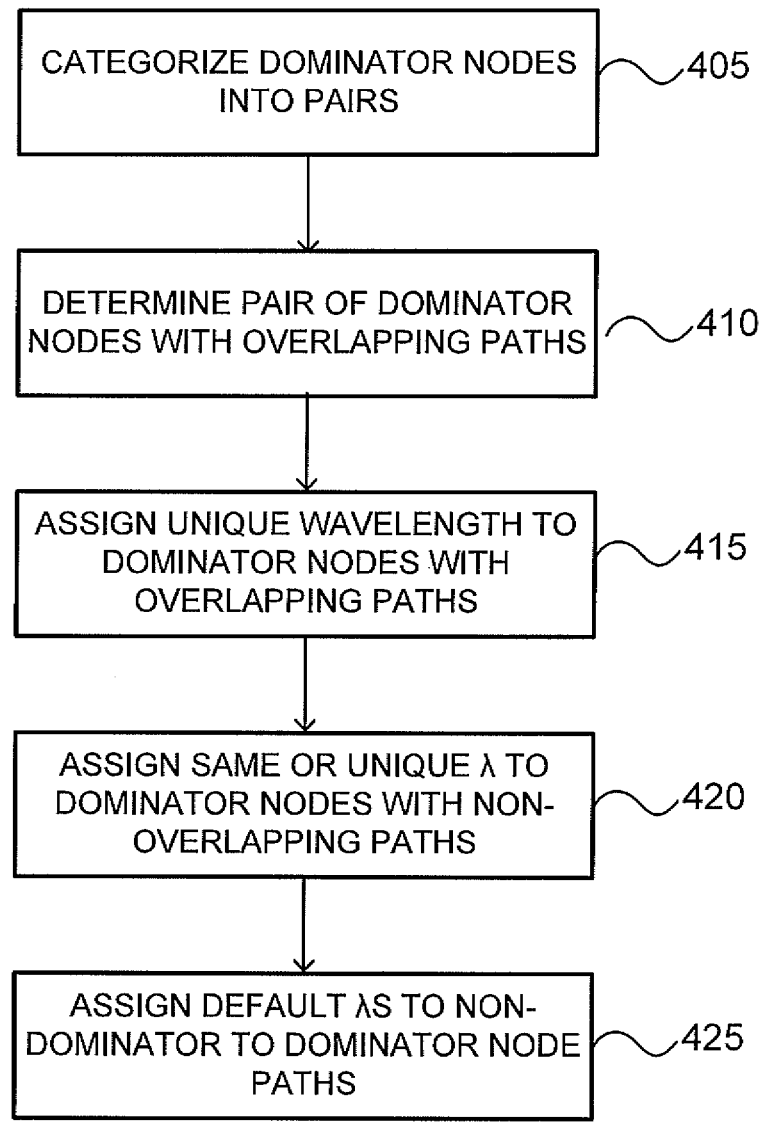
FIG. 4 depicts flow diagram of a method for assigning wavelengths suitable for use in the various embodiments described herein network of FIG. 1.

FIG. 4 depicts flow diagram of a method for assigning wavelengths suitable for use with respect to the network of FIG. 1. The method 400 of FIG. 4 may be performed by a network management system (NMS), element management system (EMS) or other management entity.

At step 405, the dominator nodes are categorized into pairs. If there are x=|X| dominator nodes, then $x^2$ unique wavelengths are needed in the worst case (e.g., to handle worst-case-traffic-flows for the 'x' dominator nodes). Along with the default wavelength assigned to communicate between the dominator and non-dominator nodes, at most $1+x^2$ wavelengths are needed. If more bandwidth is needed between a pair of nodes, then more wavelengths as needed may be assigned on a case by case basis between the desired node pair. This method will require dynamic wavelength setup between dominator nodes alone.

At step 410, overlapping paths between dominator nodes are determined. In reference to FIG. 1, path 103-107-111-114 overlaps path 105-110-111-112. In step 415, unique wavelengths are assigned to overlapping paths. This implies that any nodes in the path between the two dominator nodes would have to use this wavelength for routing traffic between the pair of nodes. Nodes not on a path between these two nodes may use the same wavelength for routing between two other nodes as long as that path does not overlap with any other path using the same wavelength. In step 420, in one embodiment the same wavelength is assigned. In another embodiment, a unique wavelength is assigned. Illustratively, the network of FIG. 1 has 16 nodes (core routers). Nodes 103, 105, 112 and 114 form a MiDS of size 4 nodes. Any routing lookup inside the core will occur at one of these nodes, and not anywhere else. For example, traffic flowing from node 103 to node 114 has three (3) other core routers in between. The number of IP lookups may be reduced to two (2) for all packets traversing between this pair of nodes.

Applying the above method to this topology, in one embodiment a total number of sixteen [16 ($4^2$)] unique wavelengths would be needed. In another embodiment, only two (2) unique wavelengths are required using the least hop paths between any two dominator nodes. Although depicted and described with respect to two embodiments, it will be appreciated by those skilled in the art that any number of embodiments may be implemented.

In step 425, a default wavelength is assigned to any non-dominator node. These nodes use this default wavelength to communicate with the neighboring dominators. Since all links in a core network are point-to-point links (and not broadcast), the dominators may communicate back to the non-dominator neighbors using the same default wavelength. Two non-dominator nodes never communicate directly with each other.

Figure 5:
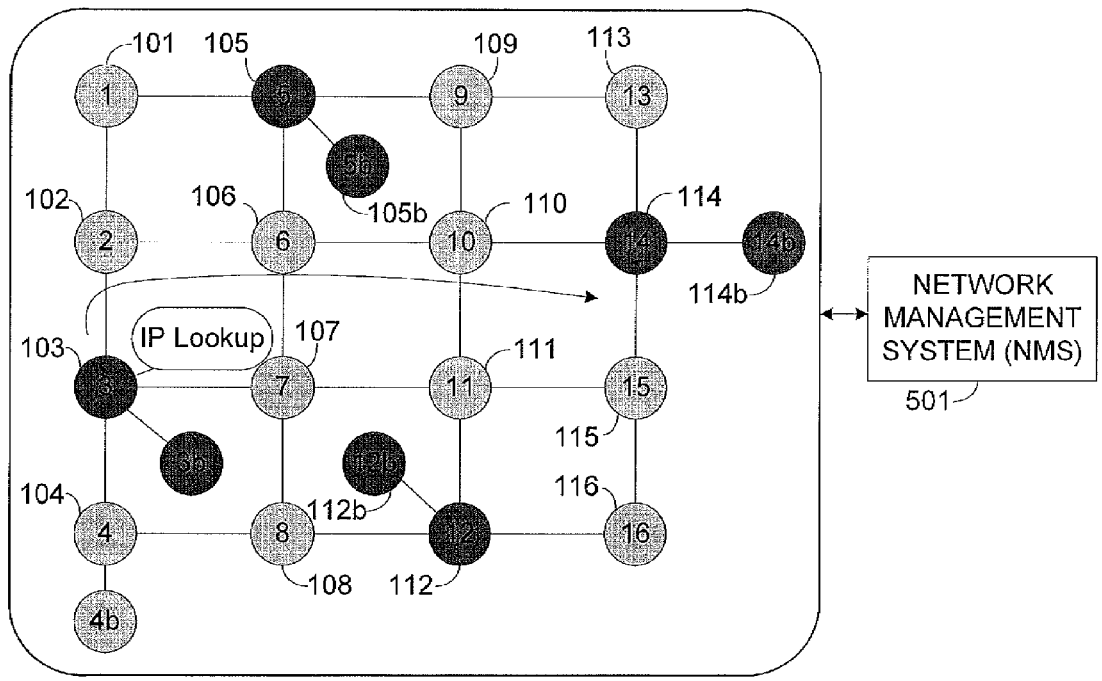
FIG. 5 depicts an exemplary network according to an embodiment.

FIG. 5 depicts an exemplary network according to an embodiment, illustratively an exemplary Optical Backbone network including a management system for managing a core network according to the embodiments discussed herein. Various network management functions may be provided by, illustratively, a network management system (NMS) 501 operatively coupled to the various networks elements discussed herein. In various embodiments, network management system 501 may improve network operations and Key Performance Indicators (KPIs) associated with network usage. For example, network management system 501 may configure the network for efficient energy consumption, load balancing and the like.

In one embodiment, dominator nodes 103b, 105b, 112b and 115b act as backup for primary dominator nodes 103, 105, 112 and 115 respectively. Redundancy is well known in the art and need not be further described here. In another embodiment, dominator nodes 103, 105, 112 and 115 use its respective backup dominator nodes to provide some back pressure relief. In this embodiment, a specific protocol is implemented to execute the functions relegated to the backup node by the primary node. In another embodiment, the backup dominator nodes provide load balancing. Load balancing is well known in the art and need not be further described here.

Figure 6:
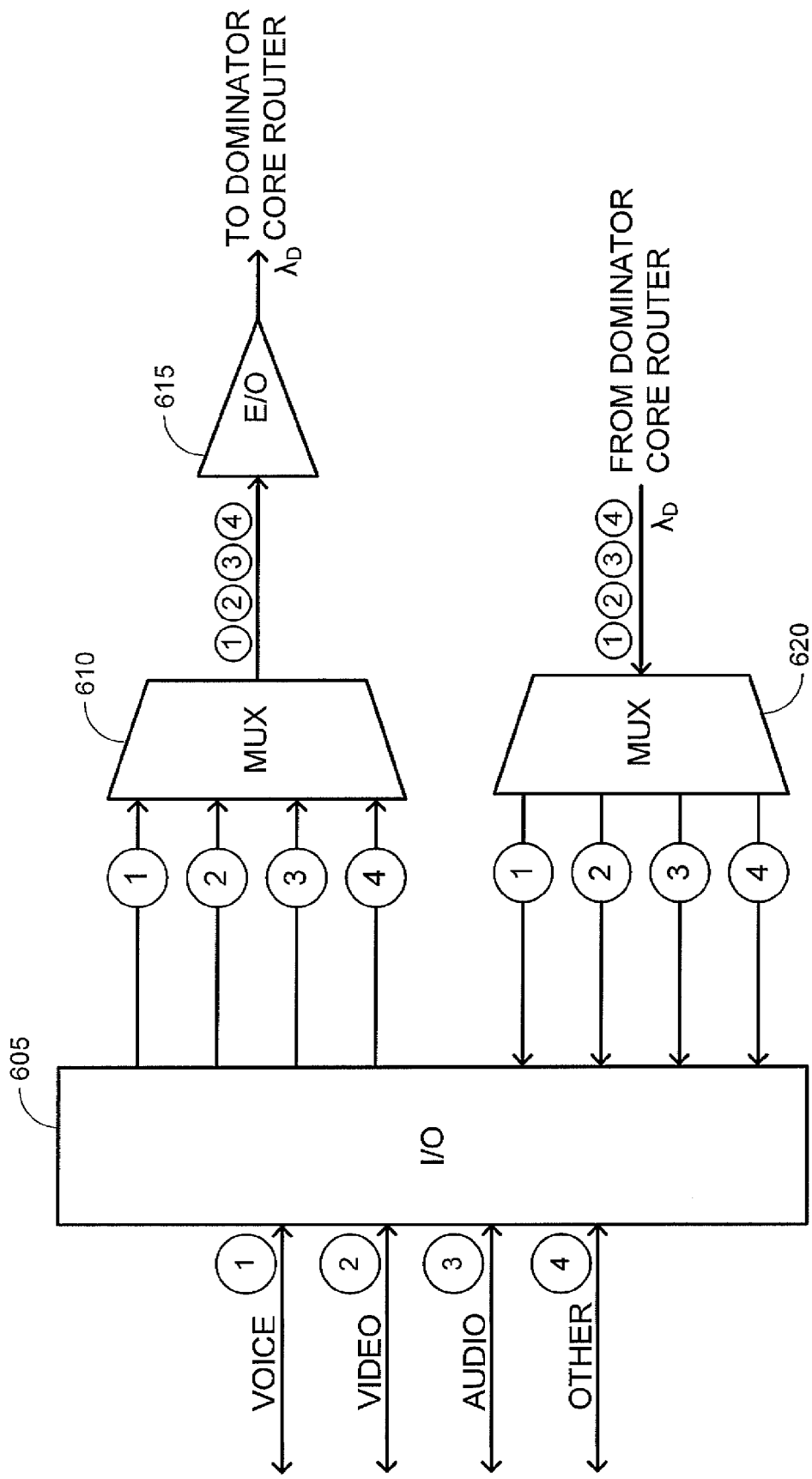
FIG. 6 depicts one embodiment of reduced function non-dominator node suitable for use in the various embodiments described herein.

FIG. 6 depicts one embodiment of reduced function non-dominator node suitable for use in the various embodiments described herein. Specifically, where a non-dominator entry core-router immediately transfers the received traffic to the nearest dominator core-router or performs limited processing functions, the architecture of the router may be significantly reduced. In one embodiment, existing router may be retrofitted such that unused circuitry is turned off. In embodiments directed to new router design, the circuitry may be tailored to the reduced functions the new router will perform. In one embodiment when the non-dominator router is the entry router, I/O block 605 performs some policing functions. In another embodiment, no function is performed. Received traffic is subsequently multiplexed at Mux 610 and converted to optical domain at converter 615.

In another embodiment where the non-dominator router is the exit router, traffic is demultiplexed at 620 and the packet departs the network.

These components as well as various components which have been omitted for purposes of clarity, cooperate to provide the functions of an Optical Transport Network (OTN).

Figure 7:
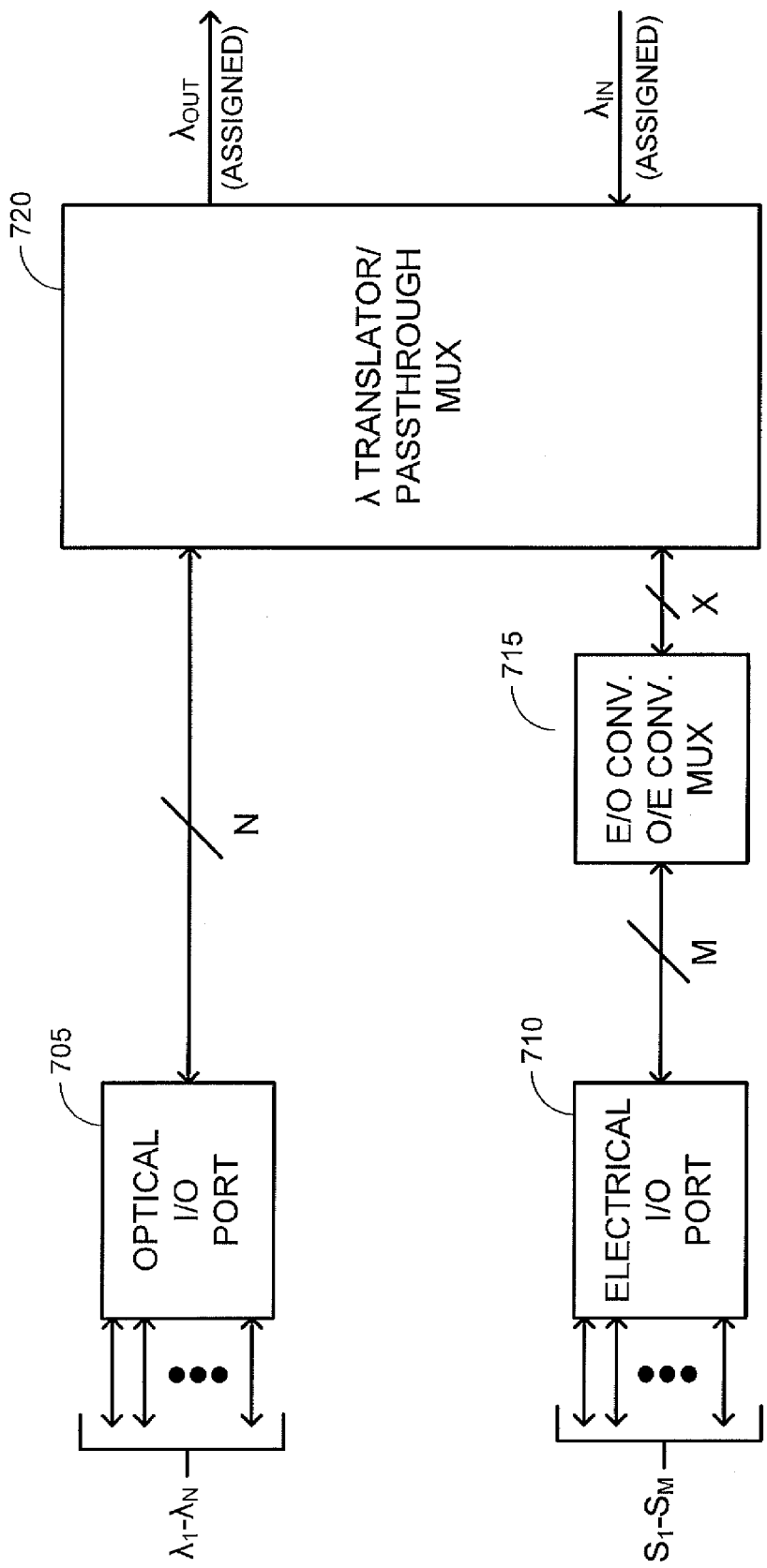
FIG. 7 depicts one embodiment of Hybrid Optical/Electrical non-dominator node suitable for use in the various embodiments described herein.

FIG. 7 depicts one embodiment of Hybrid Optical/Electrical non-dominator node suitable for use in the various embodiments described herein. Specifically, where the non-dominator core-router nodes 101-102 and 104 receive the traffic and process a portion of the received traffic prior to routing the received traffic to dominator core-router node 103, the architecture of the router may provide optical to electrical (OE) and electrical to optical (EO) conversion along the packet's path in order to perform electronic grooming, policing or other processing of packets for the dedicated wavelength assigned to the destination core-router.

In one embodiment of a reduced function router, the circuitry is tailored to the reduced functions by advantageously eliminating various power consuming elements. In one embodiment, when the non-dominator router is the entry router, electrical input/output (I/O) port 710 may perform some grooming, policing or other processing functions. In another embodiment, no function is performed. Received traffic is subsequently converted to optical signal and multiplexed at 715. The multiplexed optical signal is fed into translator/multiplexer 720 for further processing. In one embodiment, optical I/O port 705 may provide wavelength multiplexing and/or demultiplexing functions without performing any other packet processing functions.

In another embodiment when the non-dominator router is the exit router, the optical signal is converted to electrical signal at the converter/multiplexer 715 and the signal exits the network through I/O port 710.

Although depicted and described with respect to an embodiment in which non-dominator core-router nodes 101-102 and 104 are the entry non-dominator core-router nodes, it will be appreciated by those skilled in the art that core-routers 106-111, 113 and 115-116 may be an entry non-dominator core-router node and therefore, performs the functions associated with an entry non-dominator core-router node as herein described.

Figure 8:
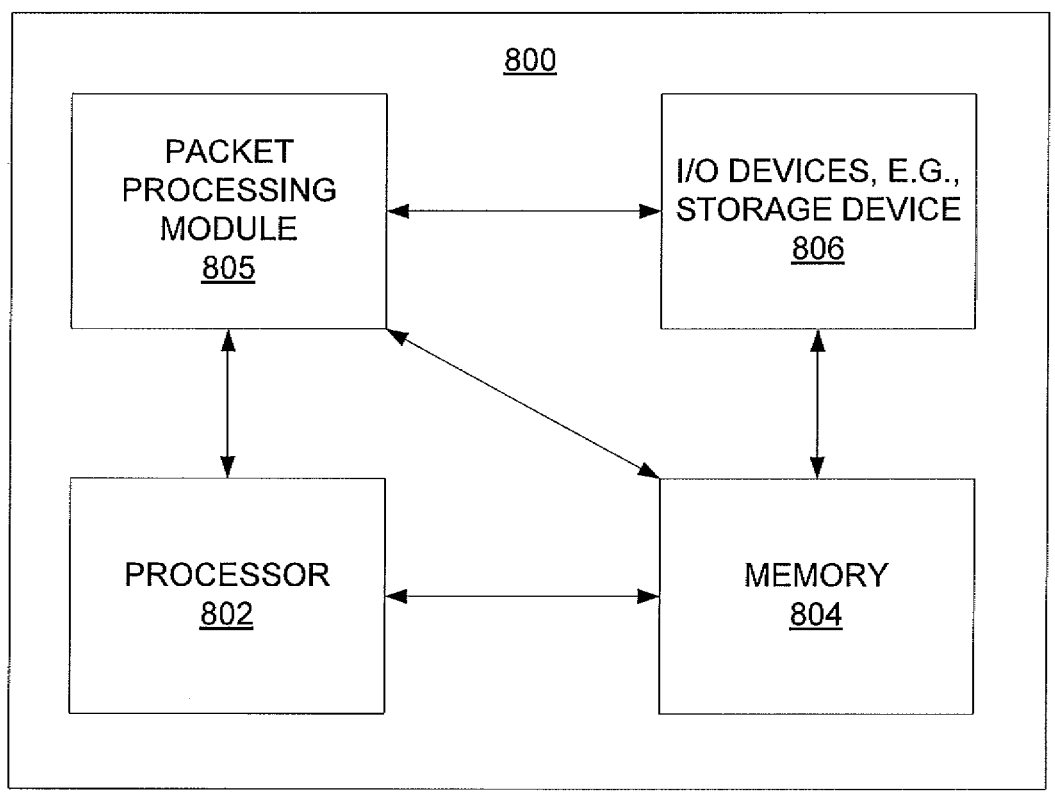
FIG. 8 depicts a high-level block diagram of a general purpose computer suitable for use in performing the functions described herein.

FIG. 8 depicts a high-level block diagram of a general purpose computer suitable for use in performing the functions described herein. It will be appreciated that computer node depicted in FIG. 8 provides a general architecture and functionality suitable for implementing functional elements described herein and/or portions of functional elements described herein. For example, computer node 800 provides a general architecture and functionality suitable for implementing one or more of dominator and non-dominator core-router nodes as discussed herein, a network management function and the like.

Functions depicted and described herein may be implemented in software in conjunction with hardware and/or hardware, e.g., using a general purpose computer, one or more application specific integrated circuits (ASIC), and/or any other hardware equivalents. For example, it is contemplated that some of the steps discussed herein as methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

Additional Wavelength Circuit Considerations

The wavelength circuits described above preferably accommodate the traffic between all pairs of routers. In various embodiments, this function is performed using either of the following techniques: (a) the traffic matrix between all core router pairs is known/estimated, and the corresponding number of wavelength circuits is set up, or (b) the circuits are assigned and de-assigned dynamically, based on traffic demands at any given instant.

With respect to approach (a), traffic between all pair of routers is very hard to predict, even though some general trends may be seen. It may also require pre-provisioning these circuits for the worst-case traffic-flows which implies wasting more optical wavelengths when the worst-case scenario is not realized. For a network with 'n' core routers, in order to provision for a unit of traffic, one will need $n^2$ unique wavelengths. Given that a typical fiber may carry a maximum of 250 wavelengths (at 100 GHz bandwidth each) theoretically, the fiber may only support $(250)^{0.5} \sim 16$ nodes. Splitting the wavelengths into 10 GHz bands does not improve the problem much, since the number of supported nodes with 2500 wavelengths is only 50 with each pair of nodes only having a 10 Gbps dedicated link between them. It is also expensive, in terms of money and energy to keep all these wavelengths active. Therefore, pre-provisioning of wavelength circuits for worst-case traffic flows may be wasteful both in terms of money and energy.

With respect to approach (b), dynamic setup of wavelengths require significant amounts of time, during which traffic entering the core has to be either buffered or routed at the IP layer.

In one embodiment, a hybrid approach is used that provides grooming traffic at intermediate routers that have a circuit already setup for some part of the path between the entry- and exit-core router. Both of the above approaches handle packets entirely in the optical path once the IP lookup has been completed, without any Optical-Electronic (OE) or Electronic-Optical (EO) conversions before the exit-core router.

In one embodiment, the approach used is that suggested by Kodialam et. al. in a paper entitled: "Preconfiguring IP-over-Optical Networks to Handle Router Failures and Unpredictable Traffic" published in the IEEE Journal on Selected Areas in Communications 25(5): 934-948 (2007), which is incorporated herein by reference in its entirety. This approach avoids the need for provisioning $n^2$ unique wavelengths to handle worst-case traffic by using load-invariant routing for optical networks, denoted as oblivious routing. Specifically, traffic is forwarded from the entry-core router to a random core router on a wavelength circuit, which random core performs an IP lookup and then forwards the traffic to the exit-core router on a dedicated wavelength circuit. This approach requires one (1) IP lookup at the intermediate core router, and n dedicated wavelengths, one per core router for routing a unit of traffic between all core router pairs. While this approach may handle variable traffic rates reasonably well, it introduces variable delays, since packets between the same entry- and exit-core routers could go through different paths. Further, this approach reduces path predictability in the network, which is a significant drawback for the service provider.

In another embodiment, the variable delay problem is avoided by assigning to each core router a dedicated wavelength. In addition, any entry-core router receiving traffic performs an IP lookup and determines the exit-core router, and sends the traffic on the dedicated wavelength assigned to that exit-core router. IP routing protocols ensure that intermediate core routers know which direction to send this wavelength (toward the exit-core router), without incurring an IP lookup anywhere else. This requires 'n' wavelengths overall and one IP lookup per packet. The key issue with this scheme is that uneven egress capacity requirements (such as traffic between select pairs of core routers being very high) may lead to unused wavelengths elsewhere in the network, and therefore increase blocking probability for new traffic entering the network.

The various embodiments provided herein avoid the drawbacks of existing work, while using much less than 'n' dedicated wavelengths in the entire core network to route a unit of traffic between all core router pairs. This comes at the expense of exactly two routing lookups at the IP layer. This arrangement provides significant energy improvements while maintaining traffic routability and predictability. The arrangement may also be engineered with link and node protection mechanisms that allow for reliability in case of a single failure in the network.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method of configuring a core network, the method comprising:
    configuring a plurality of core network nodes as dominator nodes, each dominator node being adapted to route traffic toward at least one other dominator node via a respective wavelength, each dominator node being adapted to determine a respective destination node for each traffic flow received from a non-dominator node and to route said each traffic flow toward a corresponding dominator node associated with the respective destination node, said corresponding dominator node being one of the dominator nodes;
    configuring a further plurality of core network nodes as non-dominator nodes, each non-dominator node being adapted to route respective ingress traffic flows toward a neighboring dominator node without determining corresponding destination nodes associated with the respective ingress traffic flows; and
    provisioning the respective wavelength for each pair of the dominator nodes and a default wavelength for the non-dominator nodes.

2. The method of claim 1, wherein each dominator node is configured to determine a respective destination node for each traffic flow received from a dominator node and to route each traffic flow toward the respective destination node.

3. The method of claim 1, wherein said respective destination node is determined by performing a destination IP lookup for each traffic flow received from a non-dominator node.

4. The method of claim 1, wherein said at least one non-dominator node being adapted to process said ingress traffic flows according to a policing function.

5. The method of claim 1, wherein said method is performed via a network management system (NMS) associated with at least a portion of the core network.

6. The method of claim 1, further comprising selecting said plurality of core network nodes to configure as dominator nodes according to a Minimum Dominating Set (MiDS) of nodes.

7. A method of configuring a core network, the method comprising:
    configuring a plurality of core network nodes as dominator nodes, each dominator node being adapted to route traffic toward at least one other dominator node via a respective wavelength, each dominator node being adapted to determine a respective destination node for each traffic flow received from a non-dominator node and to route said each traffic flow toward a corresponding dominator node associated with the respective destination node, said corresponding dominator node being one of the dominator nodes;
    configuring a further plurality of core network nodes as non-dominator nodes, each non-dominator node being adapted to route respective ingress traffic flows toward a neighboring dominator node without determining corresponding destination nodes associated with the respective ingress traffic flows,
    wherein at least one non-dominator node routes only a portion of respective ingress traffic flows toward the associated dominator node.

8. The method of claim 7, wherein the portion of respective ingress traffic flows routed to the associated dominator node comprises traffic originating from trusted sources.

9. The method of claim 7, wherein said respective destination node is determined by performing a destination IP lookup for each traffic flow received from a dominator node.

10. The method of claim 7, wherein the respective wavelength is further adapted for use by the dominator nodes on a non-overlapping path.

11. The method of claim 7, wherein the dominator nodes communicate with the non-dominator nodes using a default wavelength.

12. The method of claim 7, wherein at least one non-dominator node being adapted to receive optical ingress traffic flows, and to translate optical ingress traffic flows to a wavelength adapted for communicating traffic flows to said neighboring dominator node.

13. The method of claim 7, wherein at least one non-dominator node being adapted to receive electrical ingress traffic flows, and to convert electrical ingress traffic flows to optical ingress traffic flows of a wavelength adapted for communicating traffic flows to said neighboring dominator node.

14. The method of claim 7, wherein each dominator node is configured to determine a respective destination node for each traffic flow received from a dominator node and to route each traffic flow toward the respective destination node.

15. The method of claim 7, wherein said method is performed via a network management system (NMS) associated with at least a portion of the core network.

16. A method of configuring a core network, the method comprising:

configuring a plurality of core network nodes as dominator nodes, each dominator node being adapted to route traffic toward at least one other dominator node via a respective wavelength, each dominator node being adapted to determine a respective destination node for each traffic flow received from a non-dominator node and to route said each traffic flow toward a corresponding dominator node associated with the respective destination node, said corresponding dominator node being one of the dominator nodes;

configuring a further plurality of core network nodes as non-dominator nodes, each non-dominator node being adapted to route respective ingress traffic flows toward a neighboring dominator node without determining corresponding destination nodes associated with the respective ingress traffic flows, wherein a back-up pressure indicator is routed to the non-dominator node from the associated dominator node.

17. A method of configuring a core network, the method comprising:

configuring a plurality of core network nodes as dominator nodes, each dominator node being adapted to route traffic toward at least one other dominator node via a respective wavelength, each dominator node being adapted to determine a respective destination node for each traffic flow received from a non-dominator node and to route said each traffic flow toward a corresponding dominator node associated with the respective destination node, said corresponding dominator node being one of the dominator nodes;

configuring a further plurality of core network nodes as non-dominator nodes, each non-dominator node being adapted to route respective ingress traffic flows toward a neighboring dominator node without determining corresponding destination nodes associated with the respective ingress traffic flows, wherein a destination dominator node is adapted to perform a destination IP lookup for each traffic flow received from a source dominator node and to route each traffic flow toward the respective destination node via a default wavelength.

18. A non-transitory computer readable medium for storing thereon computer instructions which, when executed by a processor, perform a method of configuring a core network, the method comprising:

configuring a plurality of core network nodes as dominator nodes, each dominator node being adapted to route traffic toward at least one other dominator node via a respective wavelength, each dominator node being adapted to determine a respective destination node for each traffic flow received from a non-dominator node and to route said each traffic flow toward a corresponding dominator node associated with the respective destination node, said corresponding dominator node being one of the dominator nodes;

configuring a further plurality of core network nodes as non-dominator nodes, each non-dominator node being adapted to route respective ingress traffic flows toward a neighboring dominator node without determining corresponding destination nodes associated with the respective ingress traffic flows; and provisioning the respective wavelength for each pair of the dominator nodes and a default wavelength for the non-dominator nodes.

19. A computer program product for configuring a core network, the computer program product being embodied in a non-transitory computer readable medium storing thereon computer instructions for:

configuring a plurality of core network nodes as dominator nodes, each dominator node being adapted to route traffic toward at least one other dominator node via a respective wavelength, each dominator node being adapted to determine a respective destination node for each traffic flow received from a non-dominator node and to route said each traffic flow toward a corresponding dominator node associated with the respective destination node, said corresponding dominator node being one of the dominator nodes;

configuring a further plurality of core network nodes as non-dominator nodes, each non-dominator node being adapted to route respective ingress traffic flows toward a neighboring dominator node without determining corresponding destination nodes associated with the respective ingress traffic flows; and wherein at least one non-dominator node routes only a portion of respective ingress traffic flows toward the associated dominator node.

20. A network management system (NMS) including a computer for executing instructions which adapt the operation of the computer to perform a method, comprising:

configuring a plurality of core network nodes as dominator nodes, each dominator node being adapted to route traffic toward at least one other dominator node via a respective wavelength, each dominator node being adapted to determine a respective destination node for each traffic flow received from a non-dominator node and to route said each traffic flow toward a corresponding dominator node associated with the respective destination node, said corresponding dominator node being one of the dominator nodes;

configuring a further plurality of core network nodes as non-dominator nodes, each non-dominator node being adapted to route respective ingress traffic flows toward a neighboring dominator node without determining corresponding destination nodes associated with the respective ingress traffic flows; and provisioning the respective wavelength for each pair of the dominator nodes and a default wavelength for the non-dominator nodes.

* * * * *